United States Patent [19]

Adams

[11] Patent Number: 4,466,619
[45] Date of Patent: Aug. 21, 1984

[54] MECHANICAL SEAL ASSEMBLY WITH INTEGRAL PUMPING DEVICE

[75] Inventor: William V. Adams, Scotts, Mich.

[73] Assignee: Durametallic Corporation, Kalamazoo, Mich.

[21] Appl. No.: 499,416

[22] Filed: Jun. 2, 1983

Related U.S. Application Data

[63] Continuation of Ser. No. 411,194, Aug. 25, 1982, abandoned, which is a continuation of Ser. No. 282,885, Jul. 13, 1981, abandoned.

[51] Int. Cl.³ .......................... F16J 15/34; F16J 15/40
[52] U.S. Cl. ......................................... 277/15; 277/22; 277/59; 277/65; 277/134
[58] Field of Search .................. 277/3, 15, 17, 22, 59, 277/65, 67, 72 R, 72 FM, 81 R, 134

[56] References Cited

U.S. PATENT DOCUMENTS

| | | | |
|---|---|---|---|
| 2,230,881 | 2/1941 | Browne | 277/22 X |
| 3,081,095 | 3/1963 | Hamrick | 277/59 X |
| 3,746,350 | 7/1973 | Mayer et al. | 277/15 X |
| 3,888,495 | 6/1975 | Mayer | 277/3 |
| 3,937,477 | 2/1976 | Gyory | 277/65 X |
| 4,010,960 | 3/1977 | Martin | 277/3 X |
| 4,108,569 | 8/1978 | Rydall et al. | 277/3 X |
| 4,243,230 | 1/1981 | Baker et al. | 277/134 X |

FOREIGN PATENT DOCUMENTS

| | | | |
|---|---|---|---|
| 324763 | 2/1930 | United Kingdom | 277/134 |
| 857943 | 1/1961 | United Kingdom | 277/59 |
| 1441653 | 1/1976 | United Kingdom | 277/134 |

Primary Examiner—Robert S. Ward
Attorney, Agent, or Firm—Flynn, Thiel, Boutell & Tanis

[57] ABSTRACT

A double or tandem mechanical seal construction having as an integral part thereof a pumping structure for effecting circulation of buffer fluid. The shaft sleeve is provided with surface irregularities thereon, such as a series of circumferentially spaced slots, so that the shaft sleeve functions as a pumping rotor. The surrounding seal stator has supply and discharge ports extending radially therethrough, which ports extend substantially tangentially with respect to the shaft sleeve so that the latter, due to its rotation, will effectively pump and hence circulate the cooling or buffer fluid through the buffer chamber.

12 Claims, 3 Drawing Figures

MECHANICAL SEAL ASSEMBLY WITH INTEGRAL PUMPING DEVICE

This is a continuation of application Ser. No. 411,194, filed Aug. 25, 1982 now abandoned, which in turn was a continuation of application Ser. No. 282,885 filed July 13, 1981 also abandoned.

FIELD OF THE INVENTION

This invention relates to a double or tandem mechanical seal construction having a pumping structure integrally associated therewith for effecting circulation of a cooling or buffer fluid, whereby the cooling of the seal construction is optimized, while at the same time the need for costly auxiliary pumping equipment is eliminated.

BACKGROUND OF THE INVENTION

In recent years there has been greater demand for mechanical seal constructions which are of the double or tandem type so as to permit continued operation of an apparatus even if one of the seals should fail. With this type of construction, the stationary seal ring normally has a rotatable seal ring urged into sliding sealing engagement with each axial end thereof. The two rotatable seal rings, as disposed on opposite sides of the stationary seal ring, are often referred to as the inner and outer seals. With this double seal arrangement, an intermediate chamber is formed within the seal construction between the two seals in surrounding relationship to the shaft, and a buffer or cooling fluid is supplied to this chamber so as to cool the seal faces. The buffer fluid is circulated through a closed system by an auxiliary pump disposed externally of the seal construction. With this arrangement, the two seals operate in tandem when the buffer fluid is at a very low pressure so that the inner seal forms the primary seal, but if the high pressure working fluid leaks into the buffer chamber, then the outer seal prevents leakage. Alternately, a high pressure buffer fluid can be supplied to the buffer chamber, which buffer fluid is at a pressure higher than that of the working fluid, whereby the arrangement then functions as a double seal for preventing leakage of the working fluid.

While several manufacturers have attempted to utilize seals of this latter type over the past several years, nevertheless one of the common drawbacks of this double or tandem seal arrangement is the excessive heat generated thereby, and hence the difficulty of circulating adequate quantities of coolant or buffer fluid through the seal construction. The necessary circulation has been achievable solely by means of an auxiliary pump disposed externally of the seal construction, although most users have objected to such a system since the necessity of having to utilize an auxiliary pump for the cooling or buffer fluid necessarily increases the complexity and hence unreliability of the system. For this reason, the known double or tandem seal constructions have achieved only marginal acceptance and success.

In recognition of this problem, namely the adequate circulation of buffer or cooling fluid, one manufacturer has attempted to incorporate a pump within the mechanical seal construction. This has been accomplished by fixedly and concentrically securing an elongated pumping sleeve within the seal stator in surrounding relationship to the rotatable shaft. This pumping sleeve has a spiral pumping groove formed in the inner peripheral surface thereof. With this arrangement, however, the spiral pumping groove and its small cross section creates a severe restriction on the quantity of fluid which can be pumped or recirculated, and hence the effectiveness of this arrangement is seriously questionable. Further, this pumping sleeve occupies substantial space both axially and radially, whereby the overall seal construction becomes of greater size, and hence will not always fit within the stuffing box on some types of equipment.

Accordingly, the present invention relates to an improved mechanical seal construction which overcomes the above disadvantages. More specifically, the improved mechanical seal construction of this invention can be utilized as either a double or tandem seal, and incorporates as an integral part thereof a pumping structure which is intimately associated with the interior chamber for the buffer fluid so as to effect efficient circulation of substantial quantities of buffer fluid to thereby effect optimum cooling of the seal construction, whereby use of an auxiliary pump is hence obviated. Further, this improved mechanical seal construction, and specifically the pumping structure which is intimately and integrally associated therewith, is extremely small and compact, and in fact is formed directly on the seal stator and the shaft sleeve, whereby additional components or elements are not required for incorporation within the seal construction, thereby enabling the seal construction to maintain minimum axial and radial dimensions.

In this improved seal construction, the shaft sleeve is provided with surface irregularities thereon, such as a series of circumferentially spaced slots, so that the shaft sleeve functions as a pumping rotor. The surrounding seal stator, namely the gland insert, has supply and discharge ports extending radially therethrough, which ports extend substantially tangentially with respect to the shaft sleeve so that the latter, due to its rotation, will effectively pump and hence circulate the cooling or buffer fluid through the buffer chamber and through the external circuitry for the fluid.

This improved seal construction additionally is of a balanced construction, that is, the axial forces imposed on the rotating seal rings by the working fluid and hence transmitted onto the seal faces, are imposed over an area which is slightly less than the area of engagement between the seal faces so as to minimize heat generation on the seal faces. The seal construction also preferably utilizes a single large-diameter coil spring in surrounding relationship to the shaft sleeve for urging the seal ring against the stator, thereby minimizing the possibility of hang-up and providing the construction with added corrosion resistance, particularly when used as a tandem arrangment.

In addition, this improved seal construction, and particularly the provision of the integral pumping structure associated therewith, enables the seal construction to be utilized with higher pressures and higher speeds, while at the same time eliminating costly auxiliary pumping equipment.

Other objects and purposes of the invention will be apparent to persons familiar with seal constructions of this general type upon reading the following specification and inspecting the accompanying drawings.

Figure 1:
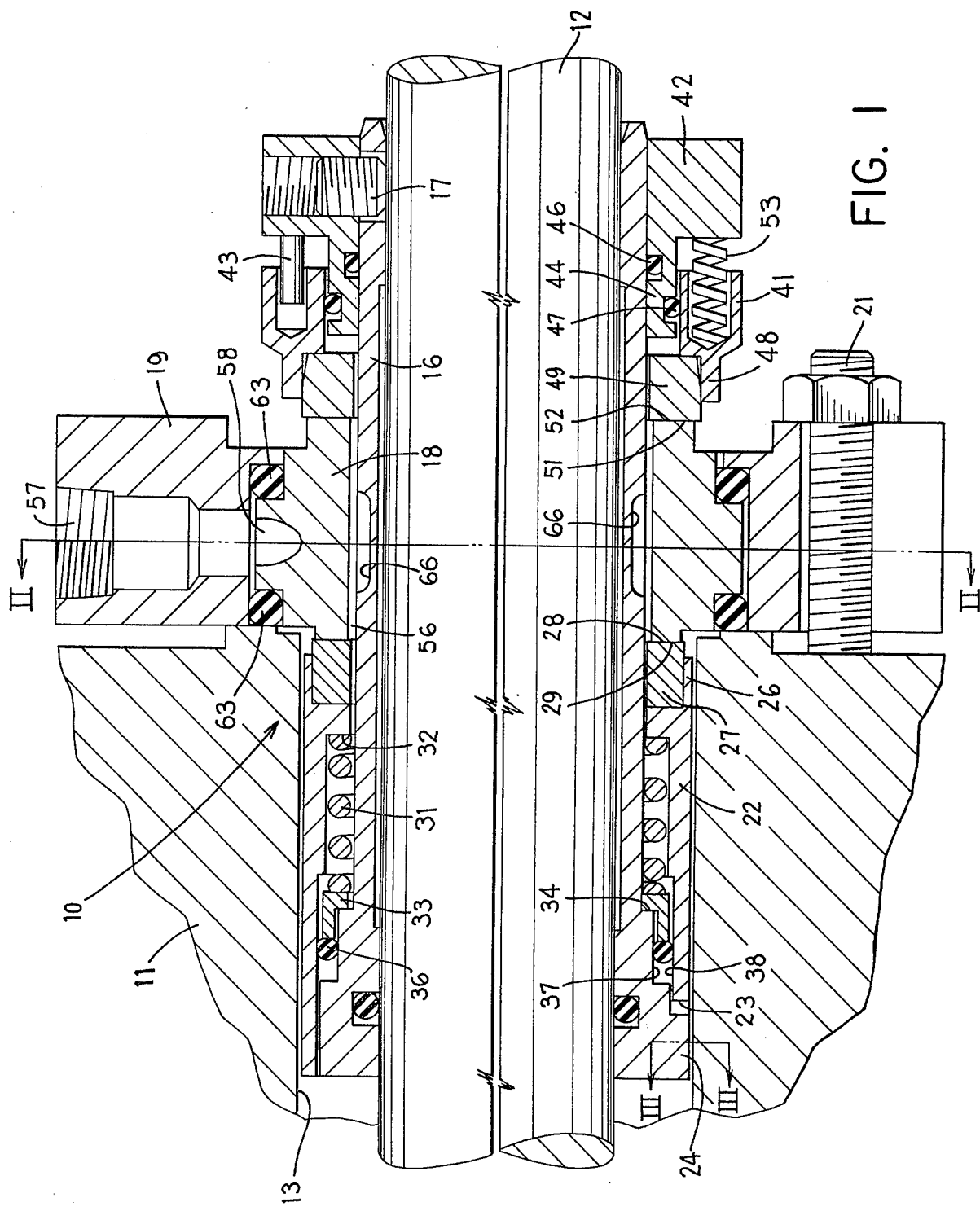
FIG. 1 is a central sectional view of a preferred embodiment of the improved mechanical seal construction to which this invention relates, same being shown in association with a rotatable shaft and a stationary housing, and taken substantially along line I—I in FIG. 2.
Figure 2:
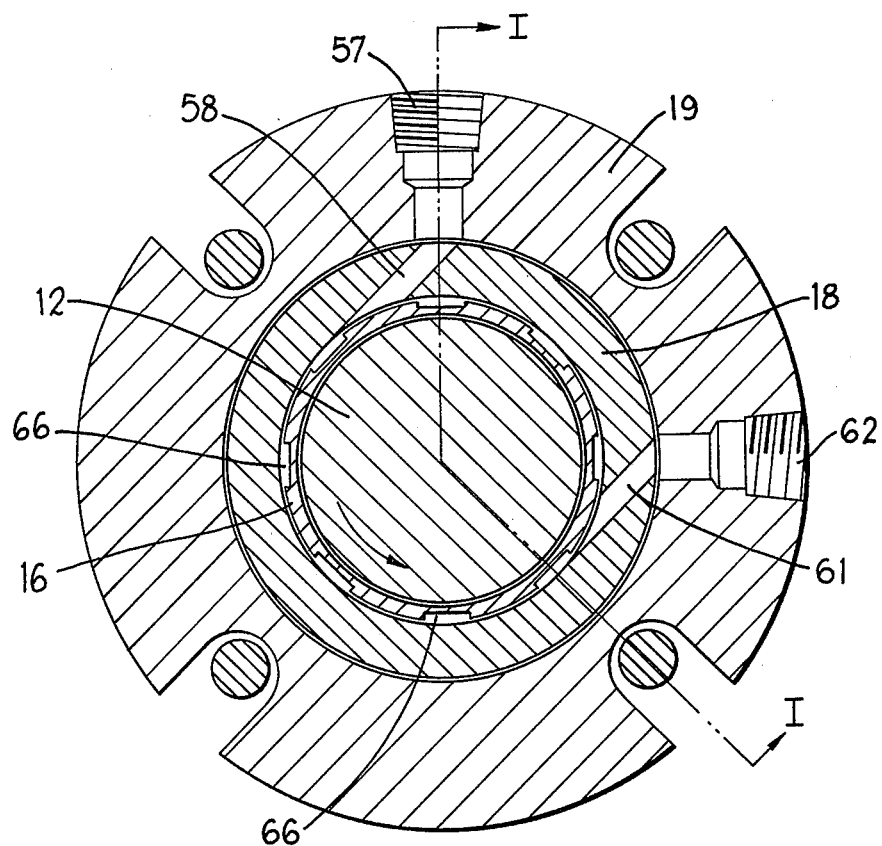
FIG. 2 is a sectional view taken substantially along line II—II in FIG. 1.
Figure 3:
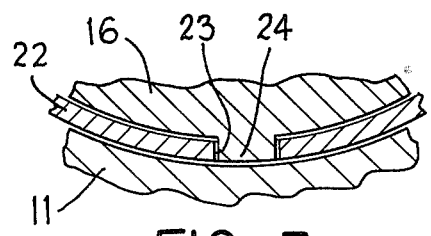
FIG. 3 is a fragmentary view illustrating the tongue-and-slot connection between the shaft sleeve and the rotatable seal ring.

Certain terminology will be used in the following description for convenience in reference only, and will not be limiting. For example, the words "upwardly", "downwardly", "leftwardly" and "rightwardly" will refer to directions in the drawings to which reference is made. The words "inwardly" and "outwardly" will respectively refer to directions toward and away from the pumping device, which directions are leftwardly and rightwardly, respectively, in FIG. 1. The words "inwardly" and "outwardly" will also have reference to directions toward and away from, respectively, the geometric center of the seal construction and designated parts thereof. Said terminology will include the words specifically mentioned, derivatives thereof, and words of similar import.

DETAILED DESCRIPTION

Referring to the drawings, there is illustrated a preferred embodiment of a mechanical seal construction 10 according to the present invention. This seal construction is of the double or tandem type and is associated with a fluid handling apparatus, such as a pumping device having a housing 11 with a rotatable shaft 12 projecting therefrom. The housing 11 defines therein a cylindrical opening 13 (commonly known as stuffing box) in surrounding relationship to the shaft 12 so as to accommodate therein the seal construction.

The seal construction 10 includes an elongated sleeve 16 which surrounds and is nonrotatably secured to the shaft 12, such as by a set screw 17. This shaft sleeve 16 is in turn closely surrounded by an annular gland insert 18, hereinafter referred to as the seal stator. This stator 18, which in the illustrated embodiment is preferably constructed of carbon, is surrounded by and nonrotatably keyed to a gland 19 which is disposed directly adjacent and fixedly connected to the housing 11, as by threaded fasteners 21.

The seal construction 10 includes a pair of face seal arrangements located adjacent the opposite axial ends of the stator 18, one seal arrangement being inwardly of the stator and the other outwardly thereof.

Referring first to the inward face seal arrangement, same is defined by a seal ring 22 (hereinafter referred to as the seal rotor) which is positioned within the opening 13 and surrounds the shaft sleeve 16. This seal rotor has a slot 23 extending axially inwardly from the inner end thereof, which slot 23 snugly but slidably accommodates therein a tongue or flange 24 as formed on the inner end of the shaft sleeve 16. This arrangement 23-24 enables the seal rotor 22 to axially slide and also angularly tilt a limited extent relative to the shaft sleeve. At the same time, this elongated slot and its cooperation with the planar side surface on the elongated tongue 24 prevents localized wear and hence prevents hang-up of the rotor 22.

The other end of the seal rotor 22 has a projecting annular flange 26 which surrounds an annular face ring 27, the latter being press fit within the flange 26. This face ring 27 has a planar front surface 28 thereon which functions as a seal face and is adapted to be disposed in rotatable sliding engagement with an opposed planar seal surface or face 29 as formed on the adjacent end of the stator 18.

The rotor 22 is urged outwardly against the stator 18 by a spring arrangement which, in the preferred embodiment, comprises a single coil spring 31 which is of substantially large diameter. This coil spring 31 is positioned within the rotor 22 in surrounding relationship to the shaft sleeve 16, whereby the outer end of the coil spring bears against an annular shoulder 32 formed on the rotor 22. The other end of coil spring 31 bears against an annular spring retainer 33 which, as illustrated in FIG. 1, is L-shaped in cross section. This retainer 33 is in turn adapted to abut against a shoulder 34 formed on the shaft sleeve 16 for limiting the spring expansion. An O-ring 36 of elastomeric material surrounds the shaft sleeve 16 directly adjacent the rearward end of the spring retainer 33, whereby the O-ring 36 creates a sealed engagement with an outer diameter 37 on the shaft sleeve 16 and an inner diameter 38 on the rotor 22.

To provide what is normally referred to as a "balanced" seal, and thereby minimize contact pressure and hence heat generation between the seal faces 28-29, the inner diameter 37 is selected so as to be larger than the inner diameter of the annular seal contact area (that is, the inner diameter of the face 28) but smaller than the outer diameter of the seal contact area (that is, the outer diameter of face 28). This thus results in the unbalanced pressure force imposed or the rotor 22 and face ring 27, which unbalanced force is rightwardly in FIG. 1 and is due to the pressurized working fluid within stuffing box 13, acting over an unbalanced area which is less than the contact area between the seal faces 28-29. The contact pressure between the seal faces is thus less subject to the influence of the pressurized working fluid and is maintained at a lower level so as to minimize wear and heat generation between the seal faces. While achieving such balance is itself known in prior seals, nevertheless the provision of such balance is believed particularly significant and critical for a double or tandem seal.

Considering now the other face seal arrangement, namely the outer face seal arrangement as disposed rightwardly of the stator 18, same includes an annular seal ring 41 (that is, a seal rotor) which is spaced from but encircles the other end of the shaft sleeve 16 and is nonrotatably but axially slidably connected thereto. The shaft sleeve 16 has an annular collar 42 fixed to the outer end thereof, which collar projects radially outwardly and is provided with one or more axial pins 43 projecting axially therefrom. These pins 43 are slidably accommodated within recesses formed in the seal rotor 41 so as to nonrotatably couple same together, while permitting axial sliding displacement and at least limited tiltability of the seal rotor 41. This collar 42 is fixed to the shaft sleeve 16 by the set screw 17. The collar 42 has a hub portion 44 which is concentrically interposed between the seal rotor 41 and the shaft sleeve 16. This annular hub 44 has an inner elastomeric O-ring 46 associated therewith for creating a sealed engagement with the shaft sleeve 16, and an outer elastomeric O-ring 47 for creating a sealed engagement with the seal rotor 41.

The seal rotor 41 has an annular flange 48 projecting from the inner axial end thereof, and an annular face ring 49 is fixedly press fit within this annular flange 48. The face ring 49 defines thereon a planar end surface 51 which functions as a seal face and is maintained in rotatable sliding engagement with an opposed flat seal face 52 as formed on the opposed end of the stator 18. Springs 53 coact between collar 42 and seal rotor 41 for urging the seal face 51 into abutting contact with the opposed seal face 52.

This second seal arrangement as created by the seal faces 51-52 is also of the "balanced" variety, this balance being achieved by providing the O-ring 47 with an outer diameter (as defined by the inner diameter of seal rotor 41) which is smaller than the maximum diameter of the seal face contact area (as defined by the maximum diameter of face 52) but is larger than the minimum diameter of the seal face contact area (as defined by the minimum diameter of face 52). This thus results in an unbalanced pressure force as imposed on seal rotor 41 and its face ring 49 acting over an area which is less than the contact area between the seal faces 51-52.

To provide for cooling of the seal construction, same defines therein an interior annular chamber 56 for receiving cooling or buffer fluid. This chamber 56 is defined between the shaft seal 16 and the surrounding stator 18 and rotors 22 and 41. This chamber 56 is sealed at opposite ends thereof by the O-rings 36 and 47. Fluid is supplied to this chamber 56 through an inlet port 57 which extends radially through the gland 19, which port 57 in turn communicates with an inlet passage 58 which extends radially through the stator 18. The fluid from the chamber 56 is discharged in a similar manner through an outlet passage 61 which also extends radially through the stator 18 and communicates with a discharge port 62 which extends radially through the gland 19. These ports 57 and 62 are connected to suitable conduits which define a closed external circuit for the cooling or buffer fluid, which circuit conventionally has a heat exchanger associated therewith.

To prevent escape of fluid as it flows between stator 18 and gland 19, there is provided a pair of O-rings 63 which surround the stator 18 and sealingly engage the gland 19, which O-rings 63 are disposed axially on opposite sides of the aforesaid ports and passages.

To achieve maximum circulation of fluid through the chamber 56, and hence optimize cooling of the seal construction, the latter is provided with a pumping structure integrated therein. This pumping structure includes the formation of a pumping rotor on the shaft sleeve 16, which pumping rotor in the illustrated embodiment is formed by a plurality of axially elongated grooves 66 formed in the periphery of the shaft sleeve 16, which grooves are disposed in angularly spaced relationship around the shaft sleeve. These grooves 66 are disposed so as to be directly radially aligned with the radially inner ends of the passages 58 and 61. In addition, the passages 58 and 61 are themselves oriented so as to extend substantially tangentially with respect to the periphery of the pumping rotor section defined on the shaft sleeve 16. The grooves 16 have an axial length which exceeds the axial dimension of the passages 58 and 61, as viewed in FIG. 1, so that the grooves 66 thus project outwardly a small extent beyond opposite sides of the passages to thereby maximize the effectiveness of the pumping action created by this structure.

In operation, the coolant or buffer fluid is supplied through port 57 and passage 58 into the chamber 56.

Due to the rotation of the shaft sleeve 16 and the provision of the pumping slots or recesses 66 thereon, the fluid within chamber 56 is pressurized and circulated throughout the chamber 56, and some of this fluid is discharged through the tangentially related outlet passage 61 so as to be recirculated through the external circuit having a heat exchanger associated therewith. In this manner, the coolant or buffer fluid can be adequately and accurately circulated through the buffer chamber so as to effect optimum cooling of the seal construction, and circulated through the entirety of the circuitry for the buffer fluid, without requiring any external pumping device. At the same time, the pumping structure as integrally associated with the mechanical seal construction is extremely compact and solely utilizes existing seal elements and components inasmuch as the pumping rotor is formed as an integral part of the shaft sleeve 16, and the passages 58 and 61 through the stator 18 are tangentially oriented relative to the pumping rotor so as to optimize the pumping effect. These structural and positional relationships, together with the close surrounding relationship of the stator 18 with respect to the shaft sleeve 16 so as to define only a narrow annular chamber therebetween, hence permits minimization with respect to the radial and axial dimensions of the seal construction, while still permitting effective pumping and circulation of the coolant or buffer fluid.

When the seal construction 10 is being used as a tandem seal such as is conventional, then the primary sealing is carried out by the inner seal 28-29 so as to prevent escape of pressure fluid from the stuffing box 13, which fluid may be at a rather high pressure, such as between 300 and 450 psi. On the other hand, the coolant or buffer fluid as supplied to the chamber 56 is pressurized only slightly above atmospheric, which pressure is enough solely to permit the circulation of the fluid. However, if the seal 28-29 should leak, then the pressurized product in stuffing box 13 will leak into the chamber 56, and the outer seal 51-52 will at least temporarily prevent product leakage.

When used as a double seal, the buffer fluid is pressurized to a level which is approximately 25 psi above the product pressure, whereupon the chamber 56 will thus be at a higher pressure level so as to effect proper sealing of both seals 28-29 and 51-52.

While the disclosed embodiment illustrates the use of slots or grooves 66 for defining a pumping rotor on the shaft sleeve 16, nevertheless it is anticipated that the pumping rotor could also be formed by utilizing some other type of surface irregularity on the shaft sleeve 16, which surface irregularity should effectively define an annular band which surrounds the shaft sleeve and is in direct relationship with the tangential passages 58 and 61. For example, it is anticipated that an annular knurled band can be provided on the exterior of the shaft sleeve 16, in place of the grooves 66, for effecting the desired pumping and hence circulating of the coolant or buffer fluid.

In addition to the relationships defined above with respect to the O-rings 36 and 47 so as to achieve a "balance" as a result of the product pressure, the seal construction of this invention is also provided with a reverse balance so as to prevent excessive contact pressure between the seal faces (such as faces 28-29) in the event that a high pressure buffer fluid is supplied to the chamber 56. To achieve this balance, the outer diameter 38 of the seal ring is preferably slightly smaller than the maximum diameter of the seal contact area (that is, the maximum diameter of seal face 29), whereby the unbalanced pressure force imposed on the seal rotor 22 by the buffer fluid will thus act on an area which is less than the seal contact area between the faces 28-29.

In the seal assembly 10 as described above, the drive and mounting arrangement for each of the seal rotors 22 and 41 enables them to float, i.e. tilt or move axially as required, as is conventional in mechanical seals.

Although a particular preferred embodiment of the invention has been disclosed in detail for illustrative purposes, it will be recognized that variations or modifications of the disclosed apparatus, including the rearrangement of parts, lie within the scope of the present invention.

The embodiment of the invention in which an exclusive property or privilege is claimed is defined as follows:

1. A mechanical seal construction for sealing a shaft which projects from and is relatively rotatable with respect to a surrounding housing, comprising in combination:

an elongated shaft sleeve nonrotatably and sealingly connectible to said shaft in surrounding relationship thereto;

an annular seal stator disposed in surrounding relationship to said shaft sleeve and being spaced therefrom by a narrow annular chamber therebetween, said seal stator being nonrotatable with respect to said housing;

said seal stator defining thereon first and second nonrotatable annular seal faces, said first and second seal faces being defined on opposite axial ends of said stator and facing outwardly in opposite directions;

a first seal rotor disposed axially adjacent one side of said stator in surrounding relationship to said shaft sleeve; said seal rotor being nonrotatably fixed to said shaft sleeve and spaced therefrom to define a first annular region therebetween which is in open communication with said annular chamber, and first deformable seal ring means coacting between said shaft sleeve and said first seal rotor for sealingly closing the end of said first annular region;

said first seal rotor having a first rotatable annular seal face formed on one end thereof and maintained in abutting sliding contact with said first nonrotatable seal face;

a second seal rotor disposed axially adjacent the other side of said stator in surrounding relationship to said shaft sleeve, said second seal rotor being nonrotatably fixed to said shaft sleeve and spaced therefrom to define a second annular region therebetween which is in open communication with said annular chamber, and second deformable seal ring means coacting between said shaft sleeve and said second seal rotor for sealingly closing the end of said second annular region;

said second seal rotor having a second rotatable annular seal face formed on one end thereof and maintained in abutting sliding contact with said second nonrotatable seal face; and pump means integrally associated with said stator and said shaft sleeve for effecting recirculation of fluid through said annular chamber, said pump means including inlet and outlet passages extending radially through said stator, the inner ends of said passages where they communicate with said annular chamber being directed substantially tangentially with respect to said shaft sleeve, said pump means also including an annular pumping rotor defined by a portion of said shaft sleeve, said pumping rotor being disposed radially directly adjacent the inner ends of said passages and having an irregular annular surface for effecting pumping of the fluid within said annular chamber.

2. A seal construction according to claim 1, wherein the irregular annular surface on said pumping rotor is defined by a plurality of grooves or recesses which are formed in said shaft sleeve and are circumferentially spaced apart therearound.

3. A seal construction according to claim 2, wherein the first elastomeric seal ring means sealingly contacts an outer annular surface as defined on said shaft sleeve having a diameter which is greater than the minimum diameter of the annular contact area between said first seal faces.

4. A seal construction according to claim 3, wherein the first elastomeric seal ring means is sealingly engaged with an inner annular surface as defined on said first seal ring rotor which has a diameter which is less than the outer diameter of the annular contact area between the first seal faces.

5. A seal construction according to claim 3, wherein the housing includes a cylindrical stuffing box opening through which the shaft concentrically projects, said shaft sleeve when mounted on said shaft projecting into said stuffing box opening, said stator being fixed to said housing directly adjacent the outer end of said stuffing box opening, and said first seal rotor being disposed within said stuffing box opening.

6. A seal construction according to claim 1, including a platelike gland fixed to said housing in surrounding relationship to said stator, said gland and stator having seal ring means coacting therebetween, said gland having inlet and outlet ports extending radially therethrough and respectively communicating with the outer ends of the inlet and outlet passages, said inlet and outlet ports being connected to an external closed circuit for the fluid which circulates through the annular chamber, said external circuit being free of circulation-effecting auxiliary pumping devices.

7. A seal construction according to claim 1, wherein the stator is of a rigid one-piece construction and has the first and second nonrotatable seal faces formed integrally on opposite ends thereof.

8. A seal construction according to claim 4, wherein the first elastomeric seal ring means sealingly contacts an outer annular surface as defined on said shaft sleeve having a diameter which is greater than the minimum diameter of the annular contact areas between said first seal faces.

9. A seal construction according to claim 1, including spring means coacting between said shaft sleeve and said first seal rotor for normally urging said first rotatable seal face into abutting sliding contact with said first nonrotatable seal face, said spring means comprising a single large-diameter coil spring disposed within said first annular chamber in surrounding relationship to said shaft sleeve.

10. A seal construction according to claim 9, wherein said first seal rotor defines thereon an axially directed shoulder which is disposed in opposed relationship to a second axially directed shoulder as defined on said shaft sleeve, said coil spring being axially confined between the opposed first and second shoulders, and a retainer plate positioned between said second shoulder and the adjacent end of said coil spring, said retainer plate having a substantially L-shaped cross-section and including a radially extending ringlike base portion which has one side thereof seated against said second shoulder and the other side thereof in engagement with the end of said coil spring, said retainer plate also including an annular axially projecting rim which is secured to said base portion adjacent the radially outer edge thereof and projects axially away therefrom in the opposite direction from said coil spring, said annular rim at the free axial end thereof being engaged with said first deformable seal ring means.

11. A seal construction according to claim 10, wherein the first deformable seal ring means sealingly contacts an outer annular surface as defined on a first portion of said shaft sleeve having a diameter which is greater than the minimum diameter of the annular contact area between said first seal faces, said first portion of said shaft sleeve being axially joined to a second portion which is of reduced diameter and defines said second shoulder at the interface therebetween, said coil spring being disposed in surrounding relationship to said second portion of said shaft sleeve.

12. A seal construction according to claim 1, wherein said first seal rotor and said shaft sleeve are nonrotatably coupled together by axially elongated tongue-and-slot means coacting therebetween adjacent the end of said first rotor which is remote from said stator, said tongue-and-slot means comprising an axially elongated slot formed in said first rotor and an axially elongated tongue which is formed on said shaft sleeve and projects radially therefrom into said slot, both said tongue and said slot defining substantially parallel and axially elongated planar side surface for permitting the tongue to be snugly but axially slidably confined within the slot.

* * * * *

UNITED STATES PATENT AND TRADEMARK OFFICE
CERTIFICATE OF CORRECTION

PATENT NO. : 4 466 619
DATED : August 21, 1984
INVENTOR(S) : William V. Adams

It is certified that error appears in the above-identified patent and that said Letters Patent is hereby corrected as shown below:

Column 8, line 26; change "claim 3" to ---claim 2---.

Column 10, line 17; change "surface" to ---surfaces---.

Signed and Sealed this

Fifth Day of March 1985

[SEAL]

Attest:

DONALD J. QUIGG

*Attesting Officer*     *Acting Commissioner of Patents and Trademarks*